United States Patent [19]

Helmy

[11] Patent Number: 4,858,378
[45] Date of Patent: Aug. 22, 1989

[54] LANDSCAPING SYSTEM

[76] Inventor: Ibrahim F. Helmy, 6800 Park Ten Blvd., Suite 222 N., San Antonio, Tex. 78213

[21] Appl. No.: 151,014

[22] Filed: Feb. 1, 1988

[51] Int. Cl.$^4$ ............................................. H01G 1/00
[52] U.S. Cl. ......................................... 47/33; 47/25; 47/9
[58] Field of Search ................. 49/9, 25, 32, 33, 28 R, 49/23, 26, 29, 30, 31

[56] References Cited

U.S. PATENT DOCUMENTS

| | | | |
|---|---|---|---|
| 2,978,837 | 4/1961 | Daniels | 47/25 |
| 3,287,851 | 11/1966 | Cramer | 47/25 |
| 3,571,972 | 3/1971 | Carter, Jr. | 47/25 |
| 3,704,004 | 11/1972 | Carter, Jr. | 47/9 X |
| 4,268,992 | 5/1981 | Scharf, Sr. | 47/23 |

Primary Examiner—Richard J. Johnson
Assistant Examiner—Lynda M. Cofsky
Attorney, Agent, or Firm—Gunn, Lee & Jackson

[57] ABSTRACT

A modular landscaping system variable in size and configuration usable when making shrubbery and flower beds for masking ground surface surrounding bed plants, for permitting watering of the plants from a single location, and for enhancing the aesthetic characteristics of ground surfaces in the beds. The system comprises a plurality of interlocking plastic plates, each having one or more plant holes through which plants may extend. Each plant hole is surrounded by a flared collar which collars a plant's stalk several inches above ground level. The collar is designed to be adjustable in size for use with differently sized plants. Each plate has a raised rim along the portions of its periphery which are not interlockable with other plates. In the assembled system, the rims of the plates collectively form a liquid retaining barrier which, in combination with the number of small seepage holes passing through each plate near the plant holes, allows the plants within the system to be watered from one location. The system includes end plates which may interlock with each other or with intermediate plates to allow widely varying sizes and configurations for the overall system. The plates are decorativley shaped to enhance the aesthetic aspects of the area in which they are used.

19 Claims, 9 Drawing Sheets

LANDSCAPING SYSTEM

FIELD OF THE INVENTION

The present invention relates to apparatuses for grounds manicuring and maintenance for landscapers.

SUMMARY OF THE INVENTION

It is an object of the present invention to provide a landscaping system which masks the ground surface which surrounds areas having closely and regularly spaced trees or shrubs.

It is another object of the present invention to provide a landscaping system which permits watering of closely and regularly spaced plants from a single site.

It is another object of the present invention to provide a modular system for masking ground surface surrounding trees and shrubs which system is variable in size and shape for conforming to desired landscape layouts.

It is another object of the present invention to provide a modular landscaping system for masking ground surface adjacent to trees and shrubs and at the same time enhancing the aesthetic characteristics of the area of the system's use.

It is yet another object of the present invention to provide a landscaping system which masks ground surface adjacent to a plurality of ornamental plants thus preventing grass and weed growth adjacent to such plants and at the same time permitting the plants to be watered from a single site.

These and other objects are satisfied by the present invention which teaches a modular landscaping system variable in size and configuration usable when making shrubbery and flower beds for masking ground surface surrounding bed plants, for permitting watering of the plants from a single location, and for enhancing the aesthetic characteristics of ground surfaces in the beds. The system comprises a plurality of interlocking plates, each having one or more plant holes through which plants may extend. Each plant hole is surrounded by a flared collar most closely approaching a plant's stalk several inches above ground level. The collar is designed to be adjustable to define a range of plant hole sizes making the plates usable with differently sized plants. Each plate has a raised retaining barrier along the portions of its periphery which are not interlockable with other plates. In the assembled system, the retaining barriers of the plates collectively form a receptacle capable of retaining liquid. This, in combination with the number of small seepage holes passing through each plate near the plant holes, allows the plants within the system to be watered from one location.

A variety of plate configurations are available for the system having anywhere from one to four interlocking sides for joining with other plate(s) to permit widely varying sizes and configurations for the overall system.

The plates may be formed in a number of decorative shapes to for variable aesthetic effects for the area in which the system is installed.

DETAILED DESCRIPTION OF THE PREFERRED EMBODIMENT

The present invention teaches a modular landscaping system which masks the ground surface adjacent to plants to prevent weed and grass growth in a precisely delineated area surrounding the plants, permits watering each plant within the system by applying water to a single location within the boundary of the system, and provides an attractive receptacle for holding landscaping gravel, wood chips, or similar materials. The system is variable in size and configuration to adapt to a number of different landscaping schemes.

Figure 1:
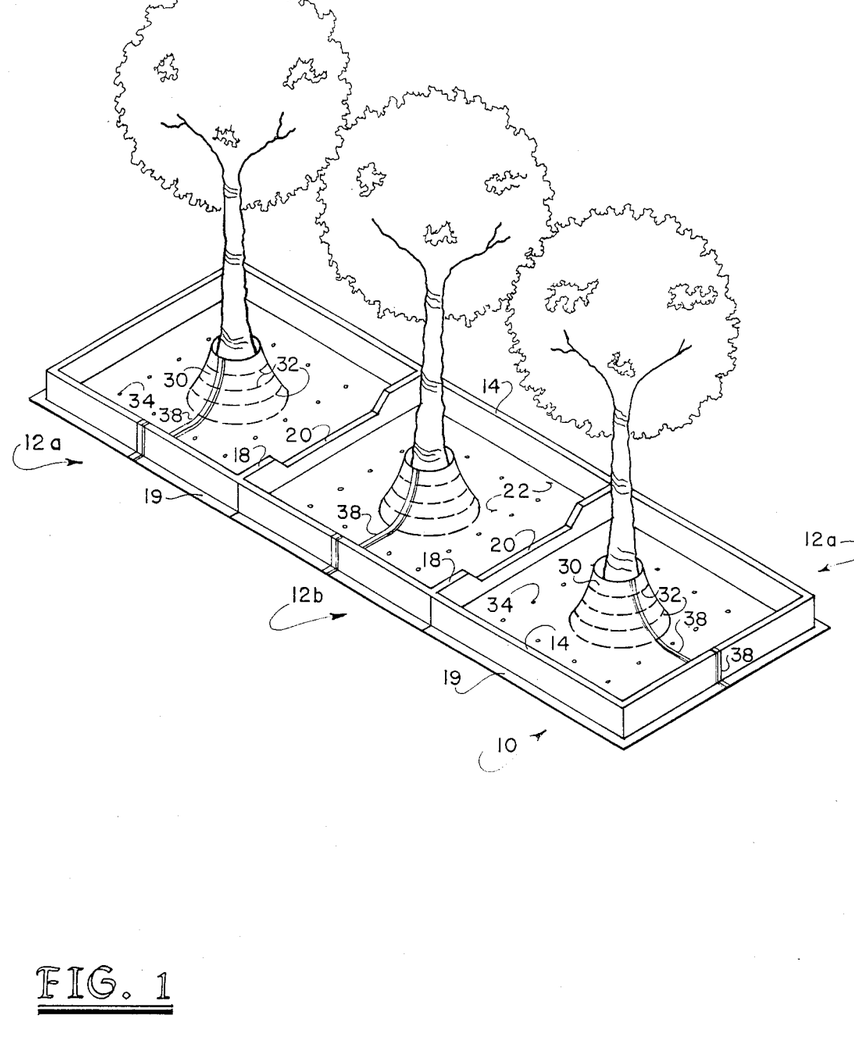
FIG. 1 is a perspective view of a simple configuration of the preferred embodiment.

A simply configured landscaping system is shown in FIG. 1 and is generally referenced by the numeral 10.

Figure 2:
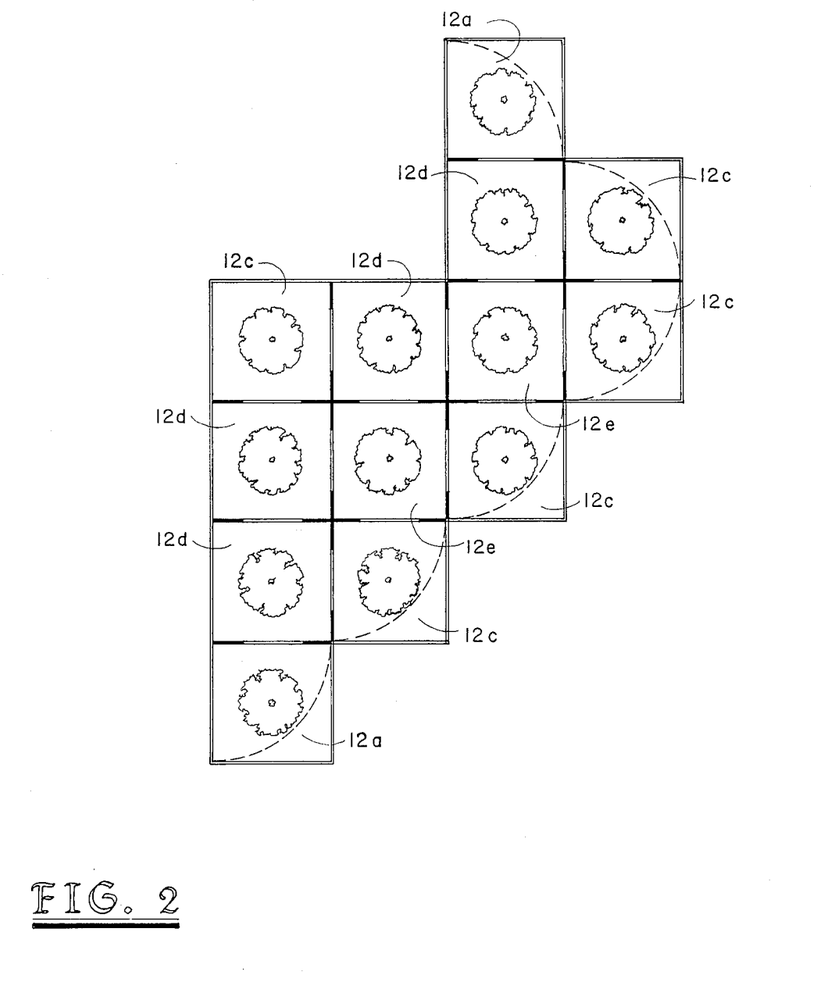
FIG. 2 is a schematic plan view of a complex configuration of the preferred embodiment utilizing five different plate adaptations.
Figure 3:
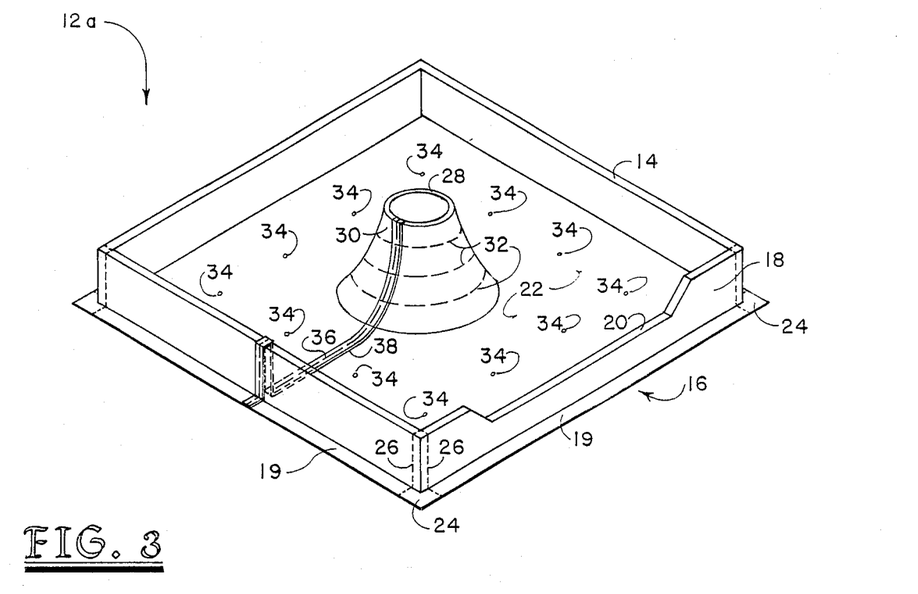
FIG. 3 is a perspective view of an end plate having one interlocking side.
Figure 4:
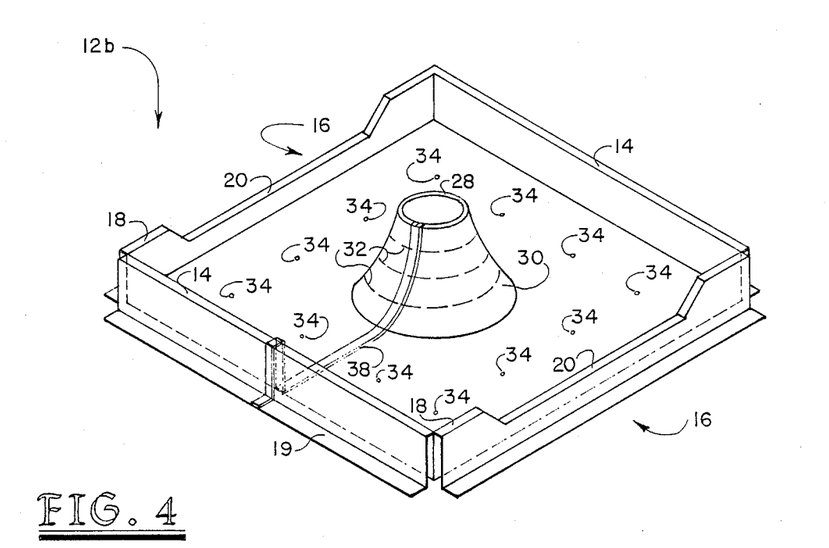
FIG. 4 is a perspective view of a straight line intermediate plate having two interlocking sides.
Figure 5:
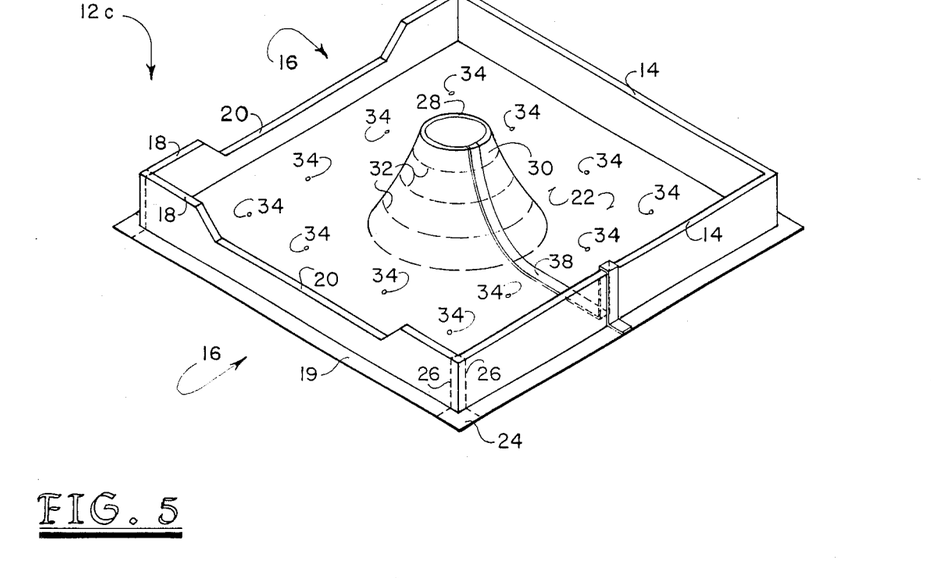
FIG. 5 is a perspective view of a corner plate having two interlocking sides.
Figure 6:
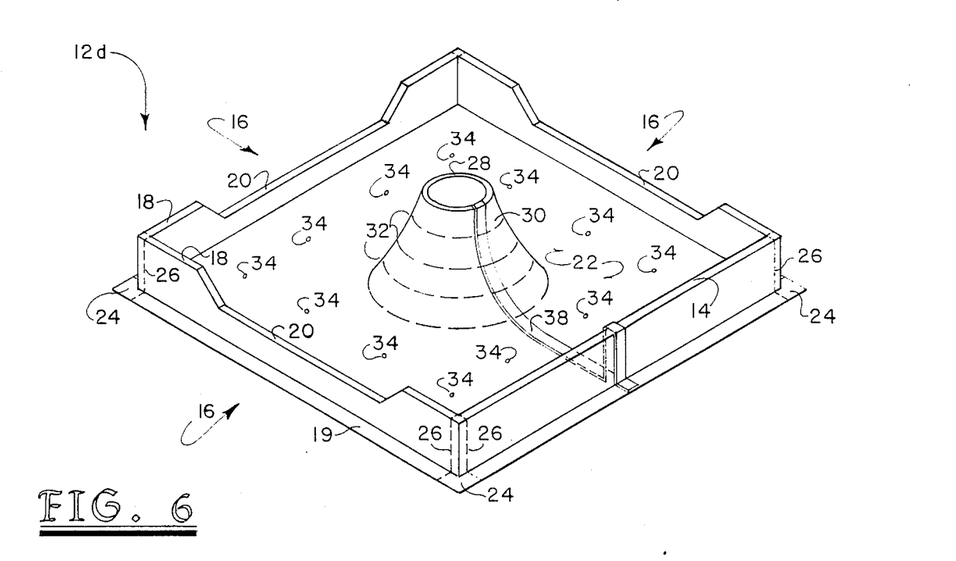
FIG. 6 is a perspective view of a T-plate having three interlocking sides.
Figure 7:
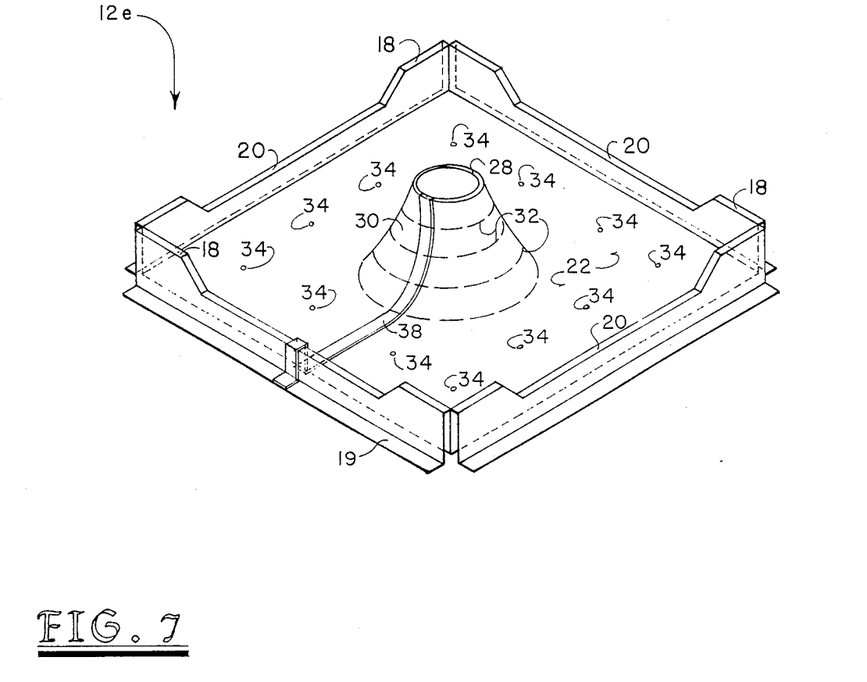
FIG. 7 is a perspective view of a four way plate having four interlocking sides.

Referring to FIGS. 1 and 2, the landscaping system 10 comprises plates which may be interlocked in varying numbers and configurations. Except when using plates designed for individual use (to be discussed hereinafter) the installed system 10 will, at a minimum, include two end plates 12a connected directly to each other. The system 10 shown in FIG. 1 includes a third, straight line intermediate plate 12b which intervenes two end plates 12a. Highly variable configurations, such as shown in FIG. 2, may be achieved by incorporating corner plates 12c, T-plates 12d, and four way plates 12e.

The plates of the preferred embodiment are made of vinyl on the order of 0.030 inches in thickness and are manufactured by a simple stamping process. The material and method of manufacture renders the plates very inexpensive to produce and potentially quite inexpensive to purchase at retail. The cost of having the necessary dies made will likely be the most significant aspect of production costs.

Referring to FIGS. 3, 4, 5, 6, and 7, each plate of the preferred embodiment has an approximately three inch high retaining barrier 14 on each of its sides which are not intended to interlock with other plate(s). In other words, when dealing with a system 10 with essentially rectangular plates as shown in the drawings, a retaining barrier 14 will be present on three sides of each end plate 12a, two sides of each straight line intermediate plate 12b or corner plate 12c, and on one side of each T-plate 12d. The four way plate 12e will have no retaining barrier 14. The side or sides of each plate which lack a retaining barrier 14 are called interlocking sides 16 and have, instead of a retaining barrier 14, an interlocking ridge 18. When the plates are locked together, the retaining barriers 14 collectively form a continuous wall at the system's periphery which, in turn, transforms the system 10 into a large receptacle capable of retaining gravel, wood chips and, most importantly, water within its boundaries.

The retaining barriers 14 and the interlocking ridges 18 are both double-layered structures and are merely continuations of the floor section 22 of each plate. The inner layer of each retaining barrier 14 or interlocking ridge 18 rises above the floor section 22 at an approximately ninety degree angle relative to the floor section 22. At the respective apex of the retaining barrier 14 or interlocking ridge 18 at the aforementioned three inch level, the ridge 18 turns one hundred eighty degrees and, in the form of an outer layer, runs parallel to the inner layer until it terminates in an anchoring lip 19. Each anchor lip 19 is situated parallel with the floor section 22 and is directed away from the center of each plate. The anchor lips 19 are useful in securing the plates to a ground surface by driving one or more spikes through the anchor lips 19 and into the ground surface. In the case of the retaining barrier 14, the double-layered configuration provides stability for the plate and makes feasible the presence of the anchor lip 19. In the case of the interlocking ridge(s) 18, the double-layered structure permits a mating arrangement between two plates as will be shown hereinafter.

Referring again to FIGS. 3, 4, 5, and 6, the primary feature which most distinguishes an interlocking ridge 18 from a retaining barrier 14 is the spillway 20. The spillway 20 is for permitting water to pass to or from adjoining, interlocked plate(s). At either end of each interlocking ridge 18 is a corner panel 24 which is easily separable from the remainder of the plate and is delineated by two corner plate tear lines 26. The corner panels 26, when removed, permit the outer layer of the interlocking ridge 18 to overlap the interlocking ridge 18 of an adjoining plate. The corner panel 24 is shown still in place in FIGS. 3, 5 and 6, and removed in FIGS. 4 and 7.

As with collar tear lines to be discussed hereinafter, the corner panel tear lines 26 are linear, narrow portions of the vinyl which are thin, relative to the surrounding vinyl, and are for permitting the vinyl to be torn along its path to remove or separate one portion of a plate from other portions along a precise path. The dies used to produce the plates are designed to form the tear lines.

For the preferred embodiment, each interlocking ridge 18 within the bounds of its spillway 20 rises no more than approximately 1.5 inches and not less than approximately 0.75 inches from the floor 22 of its plate. The reasons for this limitation in the height of the interlocking ridge 18 is two fold: (1) liquid should be able to pass from plate to plate while still being at a lower level than the apiece of the retaining barriers 14; and (2) the interlocking ridge should be pronounced enough to help prevent two adjoining plates from readily moving relative to each other, even without any adhesive agent being used.

Figure 8:
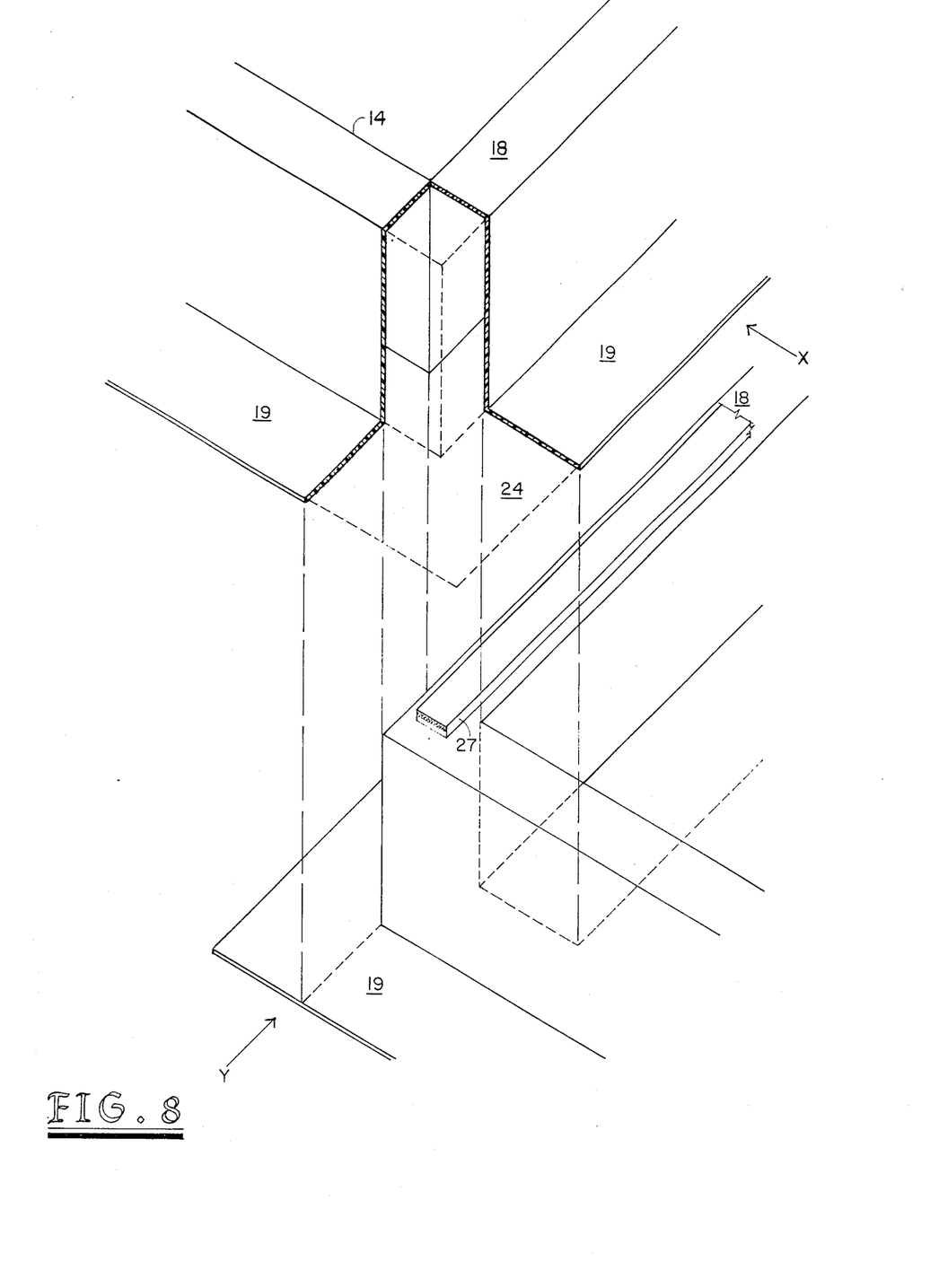
FIG. 8 is a partial perspective exploded schematic view of exemplary plates X and Y coupled at interlocking ridges.

For illustrating the joinder of any two or more plates at their interlocking ridges 18, FIG. 8 depicts the interlocking ridges 18 of two plates, X and Y. When preparing to join plates X and Y at their respective interlocking sides 16, plate X's corner panels 24 (shown in phantom) are removed by tearing along the corner panel tear lines 26, and a double-sided adhesive strip 27 is affixed along the entire length of the top of the plate Y's interlocking ridge 18. The adhesive strip 27 is preferably in the form of the foam-based kind frequently provided with minor wall-mounted fixtures for bathrooms. After removing the protective cover from the adhesive strip 27, plate Y's interlocking ridge 18 is nested within the underside of plate X's interlocking ridge 18 and the two ridges are pressed together.

As an alternative to the adhesive strips 27, various glues which are effective for bonding vinyl may be used to join the plates. It is noted, however, that a glue is not an altogether acceptable substitute for the adhesive strips 27; most glues do not bond instantaneously as do the adhesive strips 27 and most glues do not remain pliable and thereby permit a certain degree of flexibility at the bonding site between two plates.

Referring principally to FIGS. 3 through 7, each plate has one or more plant holes 28 through which a tree or shrub may extend. Surrounding each plant hole 28, is a flared collar 30 which rises several inches from the floor 22. The plate is molded such that the collar 30 has a number of collar tear lines 32. The collar tear lines 32 are narrow, circumferentially-oriented portions of the collar 30 where the vinyl is thinned, and where it may be torn with relative ease and with precise direction. Because of the shape of the collar 30, removal of vinyl at a collar tear line 32 relatively close to the floor 22 results in the plant hole 28 having a larger diameter than removal at a collar tear line 32 nearer to the top of the collar 30. Therefore, when a plant having a stalk larger in diameter than the aperture of the plant hole 28 at the top of the collar 30 is to be placed within a system 10, or as a plant grows and a larger diameter plant hole 28 is needed, the collar 30 may be torn at collar tear lines 32 successively closer to the floor 22 thus gradually enlarging the diameter of the plant hole 28 to suit the growing plant. For the preferred embodiment, the collar tear line 32 closest to the floor 22 should be no less than three inches from the floor 22. This is to insure that the ability of the plates' retaining barriers 14 to contain liquid is not partially defeated by the liquid's simply flowing over the top of the collar 30 through the plant hole 28. In no embodiment, should the collar tear line 32 closest to the floor section 22 be closer to the floor 22 than the apex of the retaining barriers 14.

The ability to gradually enlarge the plant hole 28 only as needed rather than starting with a large plant hole 28 has an important advantage. A plate having a large plant hole 28 which is only partially filled by the stalk of a plant leaves a significant space adjacent to the plant through which unwanted weeds and grass may grow. This would defeat a major objective of the system 10, which is to mask ground surface adjacent to plants to prevent weed and grass growth in the plants' immediate vicinity.

As earlier stated, another of the objectives for the system 10 is to permit watering of plants within the system 10 from a single site. The spillways 20 permit water placed within the system 10 at one plate to flow to all other plates within the system with the collective retaining barriers 14 allowing the system 10 to be filled with water. To transmit the water to the ground surface underlying the system 10, twelve. watering holes 34 are formed in the floor 22 of each plate. The watering holes 34 are very small (usually on the order of 0.050 inches in diameter). When no more than approximately twelve plates are included in an installed system 10, the effluence of water from the system 10 through the watering holes 34 is less than the inflow of water from an average garden hose with average water pressure. This insures that the entire system 10 may be filled with water and water will pass in substantially equal volume through all of the system's 10 watering holes 34 once the system 10 is filled. Since watering plants within the system 10 requires applying water at only a single location, the system 10 provides the convenience of a sprinkler system for one's plant beds without the considerable expense of having such a system installed. Although the embodiment of the system 10 described thus far is, without more, ideal for use when initially landscaping an outdoor area and when first placing small, new plants, the preferred embodiment of the system 10 includes additional features to make the system 10 usable with plants which are already in place or which have roots balls and crowns which are too large to fit through the plant hole 28, even at the time of planting.

When the system 10 is to be installed under such circumstances, a path leading from the periphery of the plate to the edge of the plant hole 28 must be available for the stalk or trunk of the plant to reach the plant hole 28. To facilitate making such a path, an access path tear line 36 is formed in the floor 20 of each plate leading from the periphery of the plate to the edge of the plant hole 28. The access path tear line 36, like the corner panel tear lines 26 and the collar tear lines 32, is merely a narrow, linear portion of the vinyl forming the plate which is thin relative to the surrounding vinyl and which, therefore, facilitates tearing the vinyl along the path defined by the tear line 36.

Since substantial water loss through the access path would prevent the system 10 from being filled with water and would, therefore, defeat one of the system's 10 major objectives, the access path must be sealed once the plant is positioned in the plant hole 28.

Figure 9:
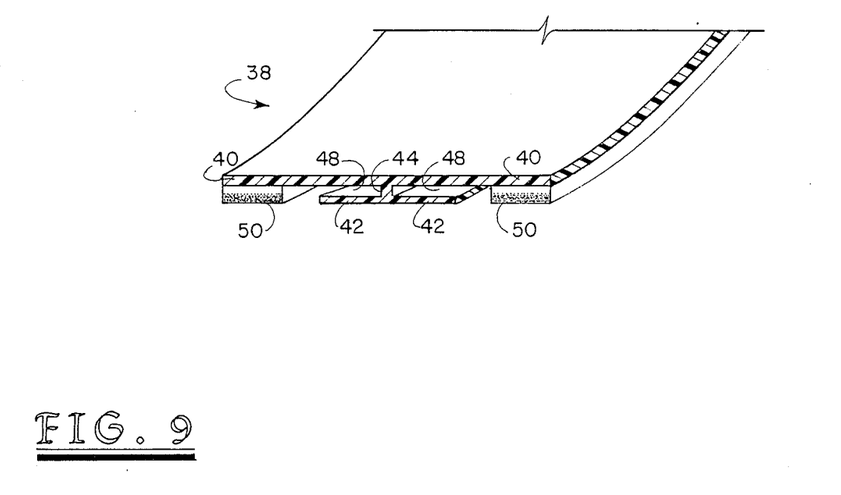
FIG. 9 is a partial perspective cross sectional view of a splicer for the preferred embodiment.
Figure 10:
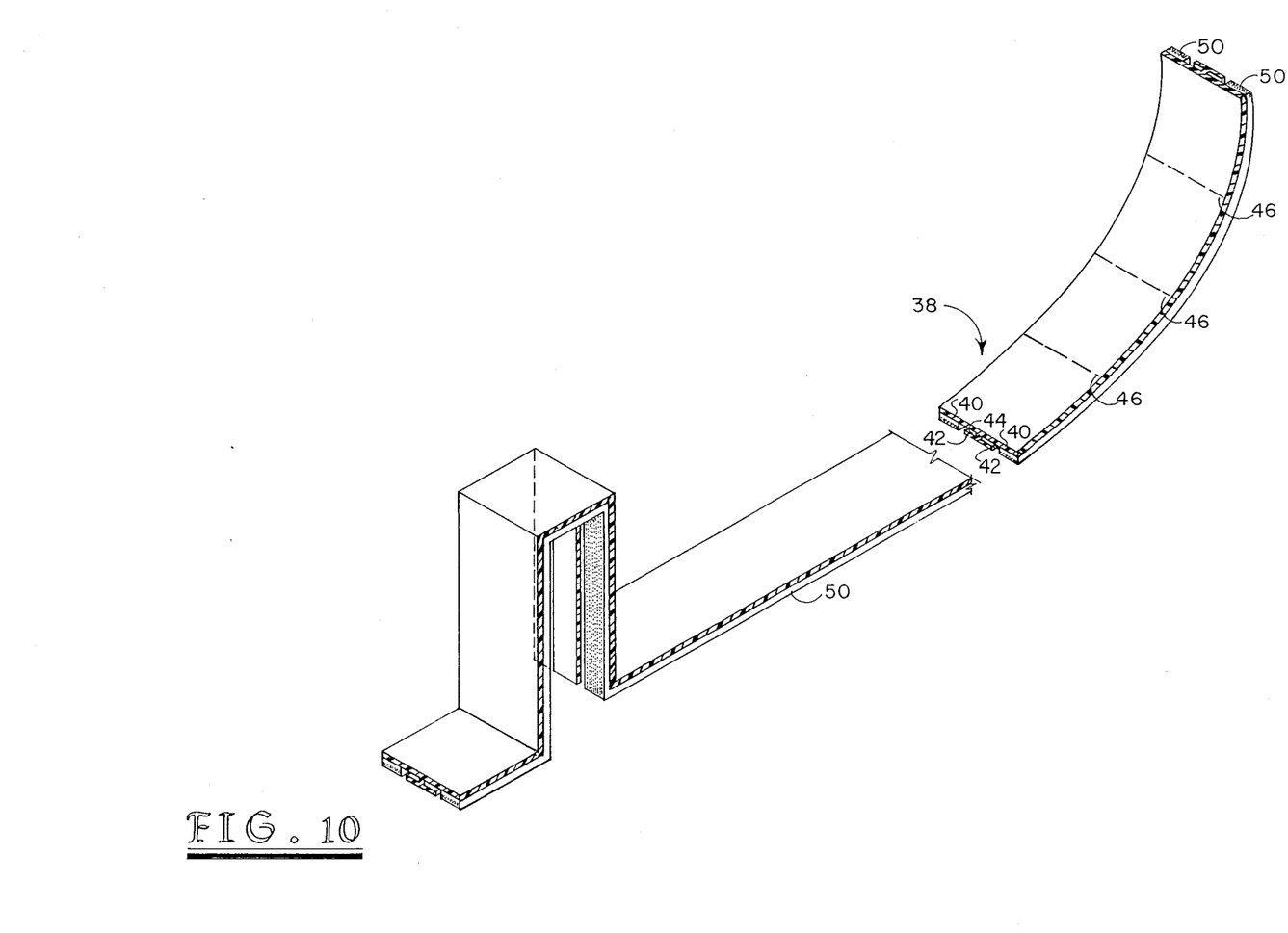
FIG. 10 is a complete perspective view of a splicer for the preferred embodiment.

Referring to FIGS. 9 and 10, a splicer 38 is provided with the preferred embodiment for sealing the access path. The splicer 38 comprises a single piece of vinyl which is in the form of a modified I-beam when viewed in cross section, and is molded to conform to the contour of the plate along the access path tear line 36. The splicer 38 has two upper surface arms 40 and two lower surface arms 42 connected and separated slightly by a narrow bridge 44. Ideally, the bridge 44 should separate the upper arms 40 and the lower arms 42 by a distance approximately equal to the thickness of the vinyl forming the plate's floor 20 on either side of the access path tear line 36. This will be approximately 0.030 inches as previously mentioned. Likewise, the width of the bridge 44 as measured in cross section should have approximately the same measurement so as not to separate the edges of the plate at the access path so much as to deform the plate and thereby prevent it from lying flat on a ground surface. Just as the collar 30 surrounding the plant hole 28 has collar tear lines 32, the portion of the splicer 38 which is to overlie the collar 30 has splicer tear lines 46 so that the splicer 38 may be adjusted as the collar 30 is adjusted.

The splicer 38 is properly positioned by placing the sides of the plate adjacent to the access path respectively in one of the two splicer channels 48 on either side of the bridge 44 between the upper surface arms 40 and the lower surface arms 42.

To hold the splicer 38 in place and to seal the access path against substantial water seepage, the splicer 38 is further provided with two splicer adhesive strips 50 affixed to the underside of the two upper surface arms 40. The splicer adhesive strips 50 are of the same variety as previously described for use on the interlocking ridges 18. Once the splicer 38 is in place, the protective covering from each splicer adhesive strip 50 is removed, and the upper arms 40 are firmly pressed against the plate to securely join the two.

Figure 11:
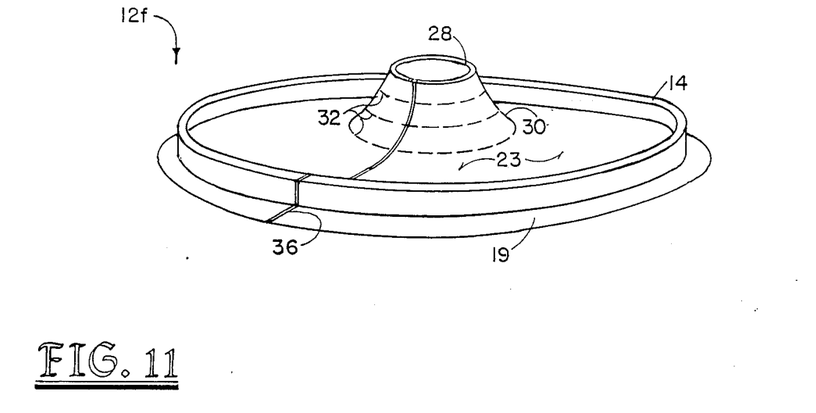
FIG. 11 is a perspective view of a plate for solitary use in protecting a single plant.
Figure 12:
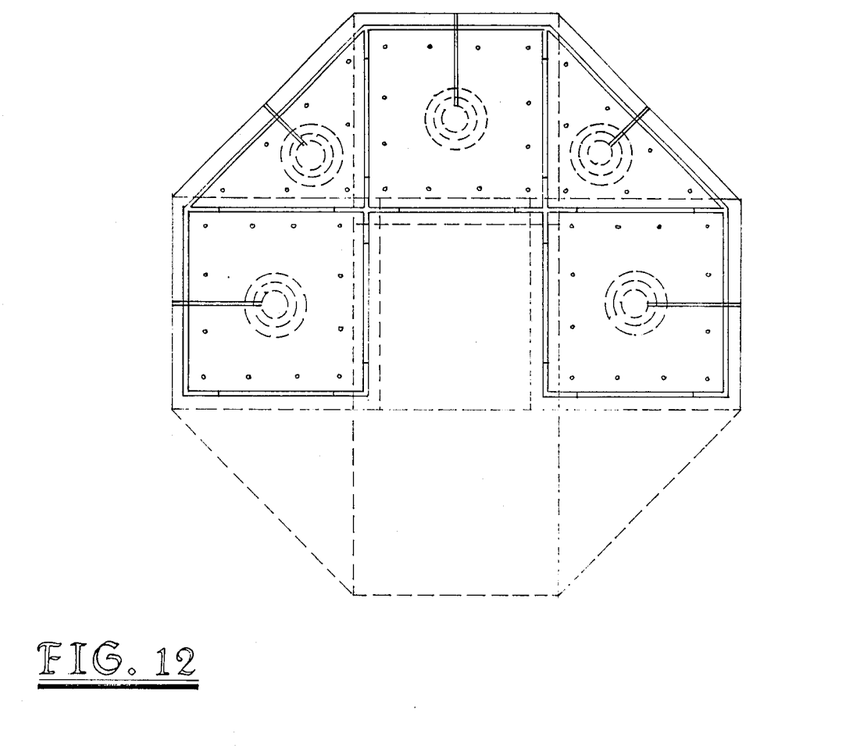
FIG. 12 is a plan view of an alternative embodiment of the invention wherein the plates are decoratively shaped.

Referring to FIG. 11, a single plant may be protected and aesthetically enhanced by a plate 12*f* manufactured according to the above described design with the exception of the presence of the interlocking ridge 18.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A modular landscaping system for masking ground surface adjacent to plants to prevent unwanted grass and weed growth, for permitting watering of said plants from a single location within said system, and for containing decorative ground covering materials within a precisely delineated boundary defined by said system thereby enhancing the aesthetic characteristics of the area near said plants comprising:

a first plate of unitary construction having a planar first floor section with a substantially round first plant hole in the approximate center thereof, a first retaining wall and a first interlocking ridge, each rising substantially perpendicular from said first floor section and collectively circumventing said first floor section at its periphery, a generally conical first collar surrounding said first plant hole and rising from said first floor section with its smallest circumference farthermost from said first floor section, said first floor section further having a plurality of first watering holes formed therethrough for permitting liquid placed in a first volume defined by said first floor, said first retaining wall, and said first interlocking ridge to pass from said first volume to a first area underlying said first plate;

a second plate of unitary construction having a planar second floor section with a substantially round second plant hole in the approximate center thereof, a second retaining wall and a second interlocking ridge, each rising substantially perpendicular from said second floor section and collectively circumventing said second floor section at its periphery, a generally conical second collar surrounding said second plant hole and rising from said second floor section with its smallest circumference farthermost from said second floor section, said second floor section further having a plurality of second watering holes formed therethrough for permitting liquid placed in a second volume defined by said second floor, said second retaining wall, and said second interlocking ridge to pass from said second volume from said second volume to a second area underlying said second plate;

said first and second interlocking ridges capable of coupling said first and second plates through a mating arrangement, said first and second interlocking ridges each respectively having a first and second spillway formed therethrough to permit a liquid placed in said first volume to pass to said second volume and vice versa without requiring said plates to be filled with said liquid sufficiently to overflow said first and second retaining walls;

said first and second retaining walls and said first and second collars rising respectively from said first and second floor sections in like directions relative to said first and second floor sections with said first and second retaining walls and said first and second interlocking ridges peripheral to said spillways rising approximately three inches above said first and second floor sections;

said first interlocking ridge having affixed thereto means for sealing said first interlocking ridge with said second interlocking ridge whereby said first and second plates may be securely affixed to each other and whereby an effluence of said liquid over said first and second spillways from said first plate passes substantially only into said second plate and vice versa;

said first collar and second collars each terminating at their said smallest circumferences approximately twelve inches from their respective said floor sections and each having a plurality of collar tear lines permitting portions of said collars successively closer to said floors to be removed by tearing the material forming said collars along said collar tear lines thereby enlarging said plant holes to accommodate larger plants, said collar tear lines closest to respective said floor sections of said first and second plates each being no less than approximately three inches from said floor;

said first and second watering holes being no more than approximately 0.050 inches in diameter.

2. The invention of claim 1 wherein said first and second interlocking ridges and said first and second retaining walls are double-layered portions of said material forming said first and second plates, said interlocking ridges and retaining walls being formed whereby an inner layer of said interlocking ridges and retaining walls are continuations of said first and second floor sections respectively and are directed substantially perpendicular to said first and second floor sections, said interlocking ridges and retaining walls each having an upper terminus from which an outer layer extends downward and parallel with said inner layers, said outer layers of said first and second retaining walls terminating in anchoring lips disposed parallel with said floor sections and extending away from the center of said plates, said form of said interlocking ridges for permitting a mating arrangement therebetween when a portion of said outer layer of said first plate at either end of said first interlocking ridge is removed to permit said first outer layer to overlap said second interlocking ridge nesting said second interlocking ridge in the underside of said first interlocking ridge coupling said first and second plates, said anchoring lips for providing portions of said plates through which spikes may be driven to anchor said plates to a ground surface.

3. The invention of claim 2 wherein two corner panel tear lines are formed in said outer layer of said first interlocking ridge at either end of said first interlocking ridge for permitting said portions of said first outer layer to be removed, in turn, to permit said mating of said first and said second interlocking ridges.

4. The invention of claim 3 wherein an access path tear line is formed in said first and second floor sections of said first and second plates extending continuously from a point on said first and a second anchor lips respectively to a point at the uppermost edge of said first and second collars respectively, said access path tear lines for permitting said material forming said plates to be torn along a predetermined path from the periphery of each said plate to said uppermost edge of said collars forming an access path whereby said plates may be placed around a large existing plants, said invention further comprising first and second means for splicing said access path for said first and second plates respectively whereby a substantially water tight seal is formed and said plates may retain water as before tearing said access path tear lines.

5. The invention of claim 4 wherein said first and second splicing means are double layered splicer strips each having two upper arms and two lower arms generally parallel with said upper arms and separated from said upper arms by a bridge situated longitudinally along the length of said splicer strips, said bridge being of a height whereby said upper and lowers arms are separated from each other by a distance approximately equalling the thickness of said material which forms said plates adjacent to said tear line, first and second splicer channels being defined by said upper and lower arms in which splicer channels edges of said plates adjoining said access path are placed, said splicer channels having adhesive means therein for adhering said upper and lowers arms to said material of said plates to form a substantially water-tight seal at said access paths.

6. The invention of claim 1 further comprising:
a third plate of unitary construction having a planar third floor section collectively bounded by a third retaining wall, a primary and a secondary third interlocking ridge, said third retaining wall, secondary and primary interlocking ridges each rising substantially perpendicular from said third floor section, said third floor section having a substantially round third plant hole formed in the approximate center thereof, said third plant hole being surrounded by a conical third collar rising from said third floor section with its smallest circumference farthermost from said third floor section, said third floor section further having a plurality of third watering holes formed therethrough for permitting liquid placed in a third volume defined by said third floor, said third retaining wall, and said third interlocking ridge to pass from said third volume to a third area underlying said third plate;

said primary and secondary third interlocking ridges being capable of respectively coupling said third plate with said first and second plates through mating arrangements, said primary and secondary third interlocking ridges each having a spillway formed therethrough to permit, when said first, second, and third plates are coupled, a liquid placed in the volume defined by said third plate's said floor section, retaining wall, and interlocking ridge to flow among said first, second, and third plates over said interlocking ridges without necessitating filling said third volume with said liquid sufficiently to overflow their said third retaining walls;

said third retaining wall and said third collar rising from said third floor section in a like direction relative to said third floor section, said third retaining wall and said third interlocking ridge peripheral to said spillway rising approximately three inches above said third floor section;

said secondary third interlocking ridge having affixed thereto means for sealing said secondary third interlocking ridge with said second interlocking ridge whereby said second and third plates may be securely affixed to each other and whereby an effluence of said liquid over said spillways between said second and third plates passes substantially only from said second plate into said third plate and vice versa;

said third collar terminating at its smallest circumference approximately twelve inches from said third floor section and having a plurality of collar tear lines permitting portions of said third collar successively closer to said third floor section to be removed by tearing said collar along said collar tear lines thereby enlarging said third plant hole to accommodate larger plants, said collar tear line closest to said third floor section of said third plate being no less than approximately three inches from said third floor section;

said third watering holes being no more than approximately 0.050 inches in diameter.

7. The invention of claims 1 wherein said first and second plates are made of a vinyl material.

8. The invention of claim 1 wherein said sealing means comprises an adhesive strip affixed to the apex of said first interlocking ridge and having an adhesive surface oriented away from said apex.

9. A modular landscaping system for masking ground surface adjacent to plants to prevent unwanted grass and weed growth, for permitting watering of said plants from a single location within said system, and for containing decorative ground covering materials within a precisely delineated boundary defined by said system thereby enhancing the aesthetic characteristics of the area near said plants comprising a plurality of plates each having a plant hole formed therethrough, said plant hole being surrounded by a generally conical collar rising above a planar floor of each said plate, said plates each having interlocking means located at a first portion of said plate's periphery and designed for permitting a sealed, substantially water tight joinder with other said plates, each said plate further having a retaining wall rising from said floor and encompassing all remaining portions of said periphery whereby said interlocking ridge along with said retaining wall defines a vessel capable of containing liquid or solid materials therein, each said interlocking ridge having a spillway formed therein whereby liquid placed in a first said plate may flow into a second said plate when said first and second plates are coupled by their interlocking means without the necessity of filling either of said plates to the point of overflowing said retaining wall thereby transforming a plurality of joined said plate into a collective vessel, said collar of each said plate having a plurality of collar tear lines formed in the material forming said collar for permitting portions said collar to be removed thereby enlarging said plant hole to accept a larger plant, said floor section of each said plate having a plurality of small watering holes to permit liquid placed in said plate to flow slowly out of said plate onto a ground surface underlying said plate.

10. The invention of claim 10 wherein said collar of each said plate rises between approximately twelve and approximately twenty inches above said floor section, said retaining wall and said interlocking ridge adjacent to said spillway rise between approximately three and approximately six inches above said floor section, and wherein said collar tear line closest to said floor section is distanced from said floor section no less than the height of said retaining wall relative to said floor section.

11. The invention of claim 10 wherein said plates are made from a vinyl material approximately 0.030 inches in thickness.

12. The invention of claim 11 wherein said plant hole is approximately twelve inches in diameter at the level of said collar tear line closest to said floor section and approximately four inches at the uppermost edge of said collar.

13. The invention of claim 12 wherein each said plate has no more than twelve said watering holes.

14. The invention of claim 9 wherein said interlocking means is a double side wall formed to permit an outer layer of a first said wall of a first said plate to overlap the entirety of a second said wall of a second said plate to permit said first and second plates to be coupled by nesting said first and second walls together.

15. The invention of claim 14 further comprising adhesive means attachable to the apex of said double sided walls to adhesively join said apex of said first said plate's interlocking means with said second plate's interlocking means.

16. The invention of claim 15 wherein said adhesive means is a double-sided, foam based tape attachable on one side of said tape to said apex of said first doublesided wall and attachable to an under side of said second double sided wall.

17. The invention of claim 9 wherein an access path tear line is formed in said material forming said plate, said access path tear line originating at a peripheral location of said plate and terminating at the uppermost edge of said collar, said access path tear line for permitting an access path to be torn in said plate whereby a stalk of a large plant which cannot pass through said plant hole may be situated through said plant hole by passing said stalk through said access path to said plant hole and further comprising splicing means to seal said access path against leakage once said access path has been formed by tearing said plate at said access path tear line.

18. The invention of claim 17 wherein said splicing means is a double layered splicer strip having two upper arms and two lower arms generally parallel with said upper arms and separated from said upper arms by a bridge situated longitudinally along the length of said splicer strip, said bridge being of a height whereby said upper and lowers arms are separated from each other by a distance approximately equalling the thickness of said vinyl which forms said plates adjacent to said tear line, first and second splicer channels being defined by said upper and lower arms in which splicer channels edges of said plates adjoining said access path are placed, said splicer channels having adhesive means therein for adhering said upper and lowers arms to said vinyl of said plates to form a substantially water-tight seal at said access path.

19. A modular landscaping system for masking ground surface adjacent to plants to prevent unwanted grass and weed growth, for permitting watering of said plants from a single location within said system, and for containing decorative ground covering materials within a precisely delineated boundary defined by said system thereby enhancing the aesthetic characteristics of the area near said plants comprising:

a first plate of unitary construction having a planar first floor section with a substantially round first plant hole in the approximate center thereof, a first retaining wall and a first interlocking ridge, each rising substantially perpendicular from said first floor section and collectively circumventing said first floor section at its periphery, a generally conical first collar surrounding said first plant hole and rising from said first floor section with its smallest circumference farthermost from said first floor section, said first floor section further having a plurality of first watering holes formed therethrough for permitting liquid placed in a first volume defined by said first floor, said first retaining wall, and said first interlocking ridge to pass from said first volume to a first area underlying said first plate;

a second plate of unitary construction having a planar second floor section with a substantially round second plant hole in the approximate center thereof, a second retaining wall and a second interlocking ridge, each rising substantially perpendicular from said second floor section and collectively circumventing said second floor section at its periphery, a generally conical second collar surrounding said second plant hole and rising from said second floor section with its smallest circumference farthermost from said second floor section, said second floor section further having a plurality of second watering holes formed therethrough for permitting liquid placed in a second volume defined by said second floor, said second retaining wall, and said second interlocking ridge to pass from said second volume from said second volume to a second area underlying said second plate;

said first and second interlocking ridges capable of coupling said first and second plates through a mating arrangement, said first and second interlocking ridges each respectively having a first and second spillway formed therethrough to permit a liquid placed in said first volume to pass to said second volume and vice versa without requiring said plates to be filled with said liquid sufficiently to overflow said first and second retaining walls;

said first and second retaining walls and said first and second collars rising respectively from said first and second floor sections in like directions relative to said first and second floor sections with said first and second retaining walls and said first and second interlocking ridges peripheral to said spillways rising approximately three inches above said first and second floor sections;

said first interlocking ridge having affixed thereto means for sealing said first interlocking ridge with said second interlocking ridge whereby said first and second plates may be securely affixed to each other and whereby an effluence of said liquid over said first and second spillways from said first plate passes substantially only into said second plate and vice versa;

said first collar and second collars each terminating at their said smallest circumferences approximately twelve inches from their respective said floor sections and each having a plurality of collar tear lines permitting portions of said collars successively closer to said floors to be removed by tearing the material forming said plates along said collars along said collar tear lines thereby enlarging said plant holes to accommodate larger plants, said collar tear lines closest to respective said floor sections of said first and second plates each being no less than approximately three inches from said floor;

said first and second watering holes being no more than approximately 0.050 inches in diameter.

said first and second interlocking ridges and said first and second retaining walls are double-layered portions of said material forming said first and second plates, said interlocking ridges and retaining walls being formed whereby an inner layer of said interlocking ridges and retaining walls are continuations of said first and second floor sections respectively and are directed substantially perpendicular to said first and second floor sections, said interlocking ridges and retaining walls each having an upper terminus from which an outer layer extends downward and parallel with said inner layers, said outer layers of said first and second retaining walls terminating in anchoring lips disposed parallel with said floor sections and extending away from the center of said plates, said form of said interlocking ridges for permitting a mating arrangement therebetween when a portion of said outer layer of said first plate at either end of said first interlocking ridge is removed to permit said first outer layer to overlap said second interlocking ridge nesting said second interlocking ridge in the underside of said first interlocking ridge coupling said first and second plates, said anchoring lips for providing portions of said plates through which spikes may be driven to anchor said plates to a ground surface an access path tear line being formed in said first and second floor sections each extending continuously from a point on said first and a second anchor lips respectively to a point at the uppermost edge of said first and second collars respectively, said access path tear lines for permitting said material forming said plates to be torn along a predetermined path from the periphery of each said plate to said uppermost edge of said collars forming an access path whereby said plates may be placed around a large existing plants, said invention further comprising first and second means for splicing said access path for said first and second plates respectively whereby a substantially water tight seal is formed and said plates may retain water as before tearing said access path tear lines;

said first and second splicing means are double layered splicer strips each having two upper arms and two lower arms generally parallel with said upper arms and separated from said upper arms by a bridge situated longitudinally along the length of said splicer strips, said bridge being of a height whereby said upper and lowers arms are separated from each other by a distance approximately equalling the thickness of said material which forms said plates adjacent to said tear line, first and second splicer channels being defined by said upper and lower arms in which splicer channels edges of said plates adjoining said access path are placed, said splicer channels having adhesive means therein for adhering said upper and lowers arms to said material of said plates to form a substantially water-tight seal at said access paths;

said sealing means comprises an adhesive strip affixed to the apex of said first interlocking ridge and having an adhesive surface oriented away from said apex.

* * * * *